Aug. 10, 1943.  C. C. KITTERMAN  2,326,466
TRAILER COUPLER
Filed July 5, 1941
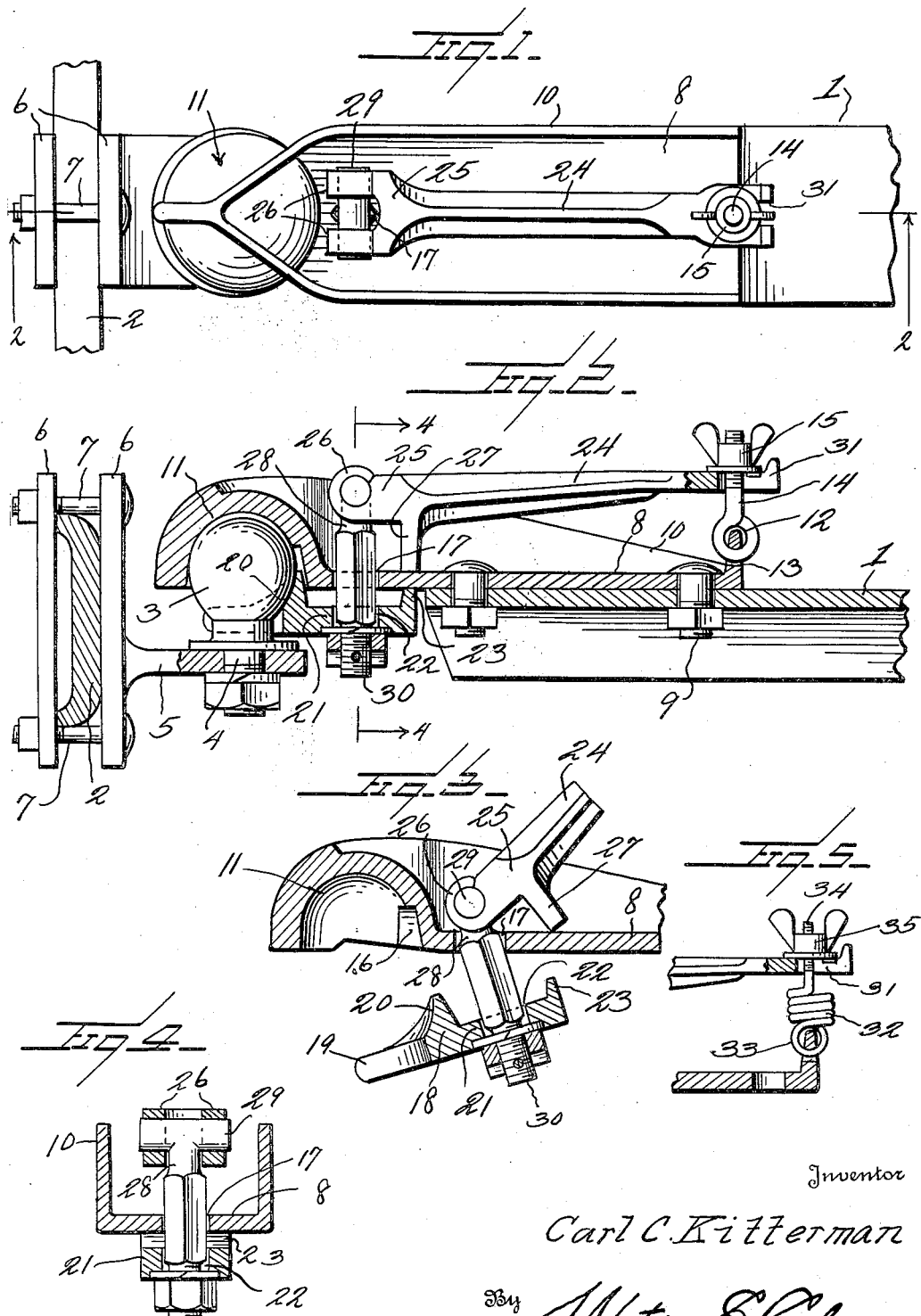
Inventor
Carl C Kitterman
By Watson E. Coleman
Attorney Patented Aug. 10, 1943

2,326,466

UNITED STATES PATENT OFFICE 2,326,466

TRAILER COUPLER

Carl C. Kitterman, Albia, Iowa

Application July 5, 1941, Serial No. 401,244

5 Claims. (Cl. 280—33.17)

This invention relates to coupling devices and particularly to devices used for the coupling of trailers to draft vehicles or for coupling together any two vehicles for articulated movement.

The principal object of the present invention is to provide an improved coupling clamp designed to be connected with a ball type head, which may be easily and quickly locked into coupling connection with said head whereby the head will be securely held but there will be permitted relative movement between the head and clamp.

Another object of the invention is to provide a coupling clamp adapted to be connected with a ball type head, which is automatically adjusting to heads of different diameters within a prescribed range.

Still another object of the invention is to provide a coupler clamp designed to receive and grip a ball head, in which a pair of cooperating elements of novel design is employed for securing a firm connection with or grip on said head, and a single means is employed for moving such elements together in cooperative relation, said means being releasably held by a single control nut and bolt.

The invention will be best understood from a consideration of the following detailed description taken in connection with the accompanying drawing, it being understood, however, that the invention is not to be considered as limited by the specific illustration or description but that such illustration and description constitutes a preferred embodiment of the invention.

In the drawing:

Fig. 1 is a view in top plan of the coupler clamp embodying the present invention.

Fig. 2 is a view in longitudinal section taken on the line 2—2 of Fig. 1.

Fig. 3 is a sectional view of the forward end of the clamp per se, showing the cooperating parts in separated relation.

Fig. 4 is a transverse section on the line 4—4 of Fig. 2.

Fig. 5 is a view illustrating a modified means of coupling the actuating or control lever with the body portion of the clamp.

Referring now more particularly to the drawing, the numeral 1 designates a bar or other element which is carried by one vehicle and to which the coupler clamp is secured in the manner shown, while the numeral 2 designates a bumper or other element of another vehicle which may be the draft vehicle, to which is secured the ball post 3, which forms a standard part of various types of hitches or couplers and in connection with which the present coupler clamp is designed to be used. The showing of the ball post 3, together with the means by which it is attached to the bumper 2 or some other part of a vehicle body, is more or less conventional. This post is here illustrated as having a stud 4 integral therewith which is passed through and secured to a plate 5 which in turn is attached to the bumper 2 by means of the two clamping plates 6 which are coupled together by bolts 7. Obviously many other ways may be employed for securing the ball 3 to its supporting vehicle, therefore, it is to be understood that this particular arrangement is in no respect limiting upon the present invention.

The coupler clamp constituting the present invention and designed for connection with ball posts of any type, comprises an elongated body plate 8 which is designed to be secured by bolts 9 or in any other suitable manner, to the bar 1 or to any other part of the vehicle with which it is to be connected. This plate 8 is preferably reinforced in the manner shown, by the provision along the longitudinal edges thereof of the webs 10 and at one end of the plate there is formed the substantially semi-spherical socket 11 into which the reinforcing webs merge, this socket being designed to receive the ball 3 in the manner illustrated in Fig. 2. At the end of the plate opposite from the socket 11 is an upstanding rib 12 in which is formed an aperture 13 for connection with the rib of the eye portion of an eye bolt 14 which is designed to have a nut 15 threaded upon the shank thereof.

In the surface of the socket at the rear side thereof there is formed a recess 16 for coaction with another part of the coupler, as hereinafter described, and immediately behind the socket the plate body 8 has formed therethrough an opening 18 of polygonal design.

Coacting with the socketed head of the coupler plate is a forked jaw 18 which has two spaced prongs 19 and at the rear of these prongs, the jaw is formed to provide an upstanding lug 20 which is adapted to engage in the recess 16 of the socket.

Extending rearwardly from the body of the jaw 18 is a short flat arm 21 through which is formed an opening 22 and at the rear end of this arm is a fulcrum rib 23 which extends across the arm.

The numeral 24 designates a lever which at its forward end has a head 25 from which extends forwardly the spaced axially alined hinge rings or knuckles 26. Immediately rearwardly of the hinge rings or knuckles 26 is a fulcrum foot 27 which rests upon the top of the body plate 8 in the assembled device as shown, the hinge rings being disposed above the opening 17.

A T-post 28 extends through the polygonal opening 17 and has its major portion of a cross-sectional design corresponding to the outline of the opening 17, so that the post cannot turn therein and the head portion 29 of this post is maintained transversely of the plate with its ends pivotally engaged in the hinge knuckles 26, as shown in Fig. 4, so that there is thus provided a pivotal or hinge connection between the post 28 and the lever 24. The lower end of the post 28 extends through the opening 22 in the arm of the jaw 18 and is screw-threaded, as indicated at 30, to receive a securing nut 31 which bears against the under side of the arm 21.

The rear end of the arm 24 is bifurcated, thus providing the slot 31, as shown, into which is received the threaded portion of the eye bolt 14, so that the arm may be secured in fixed position with respect to the plate body 8. Upon reference to Figs. 2 and 3, it will be readily seen that when the rear end of the lever 24 is released from the body 8, the head 25 may drop down toward the body 8 so as to lower the T-bolt 28 through the opening 17. This permits the separation of the jaw and socket, as shown in Fig. 3. The ball 3 may then be readily placed in position between the jaw and socket or removed as desired. If the coupling clamp is being connected with the ball, then it is merely necessary to drop the socket over the ball and oscillate the lever to cause it to pivot or fulcrum upon its foot 27, and this will pull the jaw upwardly until the fulcrum rib 23 contacts the under side of the body 8 whereupon the forward or forked portion of the jaw will swing upwardly to engage the ball 3 below the center thereof and thus cooperate with the socket in gripping the ball. When this occurs the locking lug 20 will engage in the recess 16 of the socket to establish a proper connection between these parts. The eye bolt may then be swung into position in the recess 31 in the rear end of the lever and the nut 15 threaded down into engagement with the lever to thus hold the latter in clamping position.

The present coupler clamp will maintain a firm connection with the ball 3 at all times, so that the clamp may be attached to the drawn vehicle or to the draft vehicle, as desired, and may either be pulled or pushed without danger of it becoming disconnected from the ball carried upon the other vehicle. It may also be swung with respect to the ball 3 so as to permit turning movement of the coupler vehicles.

The present hitch or clamp device may also be employed in connection with farm machinery for coupling various types of such machinery with a draft tractor. Since it is desirable in using some types of farm machinery such as plows, for example, to provide some means for automatically disconnecting the machine from the draft vehicle in the event that the plow strikes a rock, the eye-bolt 14 may be replaced by a suitably heavy coil spring 32, as shown in Fig. 5. One end of this spring may be looped to form an eye 33 for connection with the flange 12 while the other end may be extended and threaded to form a shank 34 for the reception of a wing nut 35. With this arrangement if the clamp device is connected with a plow and the ball 3 is connected with the draft machine, if the plow should strike a rock so as to put an undue strain upon the draft coupling, there will be a tendency for the socket to pull off of the ball and this will tend to separate the socket from the clamping jaw 18 and thus place a downward pull upon the head 25 ahead of the fulcrum foot 27. The spring 32 will consequently yield, thus allowing the jaw and socket to separate so as to effect an automatic uncoupling of the two vehicles.

Because of the double fulcrum action between the lever 24 and the jaw 18 with respect to the body 8, it will be seen that a relatively light force applied to the free end of the lever 24 will maintain the jaw and socket in cooperating relation with sufficient strength to overcome any strains which may be put upon the coupling and thus prevent separation of the socket from the ball. It will thus be seen that only a single relatively light securing bolt such as is shown at 14, need be employed for maintaining the parts firmly coupled together, and also it will be readily apparent that very little effort is necessary to establish the coupling of the clamp with the ball or to disengage the clamp therefrom as may be desired.

What is claimed is:

1. A coupler clamp for connection with a ball of the character stated, comprising a body having a socket formed to receive the ball, a jaw adapted to engage the ball upon the opposite side from the socket, a lever pivotally supported upon the body adjacent the socket, means coupling the lever with said jaw adjacent said pivotal support for effecting the movement of the jaw relative to the socket upon oscillation of the lever, means for detachably securing the lever to the body upon the opposite side of the lever pivot from the first-mentioned means, and an interlocking coupling between the jaw and socket.

2. A ball engaging clamp of the character stated, comprising a body formed to provide a socket for the reception of the ball, a forked jaw formed for interengagement with the socket to bear against the ball in cooperation with the socket, a pin member of polygonal cross-section connected at one end with said jaw and slidably extending through a correspondingly shaped aperture in the body adjacent the socket whereby the pin is prevented from turning, a lever having an end pivotally connected with said pin upon the side of the body opposite from the jaw, means forming a pivotal connection between the lever adjacent said end and the body for the rocking of the said end of the lever, and means for detachably coupling the other end of the lever with the body.

3. A ball engaging clamp of the character stated, comprising an elongated body having a head at one end formed to provide a ball receiving socket, a forked jaw adapted to receive and engage the ball upon the opposite side from and in cooperative relation with the socket, an arm integral with said jaw and extending in a lengthwise direction with respect to the body, said body and arm having alined openings, a post secured in the opening of the arm and extending through the opening of the body, a lever pivotally connected at one end with the post upon the opposite side of the body from the arm, the lever extending generally lengthwise of the body, means for detachably coupling the other end of the lever with the body, said socket being provided in its face with a recess, and a lug carried by said jaw for engagement in said recess when the jaw is moved into cooperative relation with the socket.

4. A ball engaging clamp of the character stated, comprising an elongated body having a head at one end formed to provide a ball receiving socket, a forked jaw adapted to receive and engage the ball upon the opposite side from and in cooperative relation with the socket, an arm integral with said jaw and extending in a lengthwise direction with respect to the body, said body and arm having alined openings, a post secured in the opening of the arm and extending through the opening of the body, a lever pivotally connected at one end with the post upon the opposite side of the body from the arm, the lever extending generally lengthwise of the body, means for detachably coupling the other end of the lever with the body, said socket being provided in its face with a recess, a lug carried by said jaw for engagement in said recess when the jaw is moved into cooperative relation with the socket, and a fulcrum forming means carried by the arm for engagement with said body upon the side of the post remote from the socket to facilitate swinging of the forked part of the jaw toward the socket upon oscillation of the lever on its fulcrum pivot toward the body.

5. A ball engaging clamp of the character stated in claim 1, in which said coupling comprises a lug carried by the jaw and having a curved face to receive a part of the ball, and a recess in the ball contacting face of the socket into which said lug seats, the curved face of the lug conforming with the recessed face of the socket.

CARL C. KITTERMAN.